United States Patent
Schumacher et al.

(10) Patent No.: US 8,496,727 B2
(45) Date of Patent: Jul. 30, 2013

(54) METHOD FOR TREATING SLAG FLOWING FROM A METALLURGICAL VESSEL AND A DEVICE FOR CARRYING OUT SAID METHOD

(75) Inventors: Edgar Schumacher, Munich (DE); Renata Franzky, Munich (DE); Sagadat Schumacher, Munich (DE); Viktor Nikolaevich Chloponin, Moscow (RU); Alexander Kasymovich Farmanov, Bekabad (UZ); Anatolij Sergeevich Kostin, Moscow (RU); Anatolij Konstantinowitch Belitchenko, Ribnitsa (MD); Andrey Vasilevitsch Judin, Ribnitsa (MD); Aleksander Nikolaevich Savjuk, Ribnitsa (MD); Nikolay Alexandrovitch Bogdanov, Revda Sverdlovskaya obl. (RU); Ewald Antonovich Schumacher, Munich (DE); Sagadat Schumacher, legal representative, Munich (DE)

(73) Assignee: Techcom GmbH, Munich (DE)

( * ) Notice: Subject to any disclaimer, the term of this patent is extended or adjusted under 35 U.S.C. 154(b) by 147 days.

(21) Appl. No.: 12/667,339

(22) PCT Filed: Jul. 3, 2008

(86) PCT No.: PCT/IB2008/001755
§ 371 (c)(1),
(2), (4) Date: Mar. 23, 2010

(87) PCT Pub. No.: WO2009/016443
PCT Pub. Date: Feb. 5, 2009

(65) Prior Publication Data
US 2010/0206132 A1 Aug. 19, 2010

(30) Foreign Application Priority Data
Jul. 4, 2007 (RU) ................................ 2007125270

(51) Int. Cl.
*C22B 7/04* (2006.01)
*B22F 9/04* (2006.01)

(52) U.S. Cl.
USPC ................... 75/330; 241/3; 241/24.11; 65/19

(58) Field of Classification Search
USPC ........................... 75/330; 241/3, 24.11; 65/19
See application file for complete search history.

(56) References Cited

U.S. PATENT DOCUMENTS
4,722,483 A * 2/1988 Saville et al. ................... 241/23

* cited by examiner

*Primary Examiner* — George Wyszomierski
*Assistant Examiner* — Tima M McGuthry Banks
(74) *Attorney, Agent, or Firm* — Notaro, Michalos & Zaccaria P.C.

(57) ABSTRACT

A steel production method in the steel and iron industry involves dividing a vertically falling solid slag stream which flows from a steelmaking furnace into individual streams, forcedly cooling the individual streams, dividing the individual streams into parts by cutting across the movement thereof, forcedly cooling the parts and transferring them to a belt conveyor on which the separate parts are forcedly cooled and transported away from the vessel. A shaped conveyor belt, on which the slag parts are crushed by means of a cylindrical roll, is used for additional crushing.

9 Claims, 3 Drawing Sheets

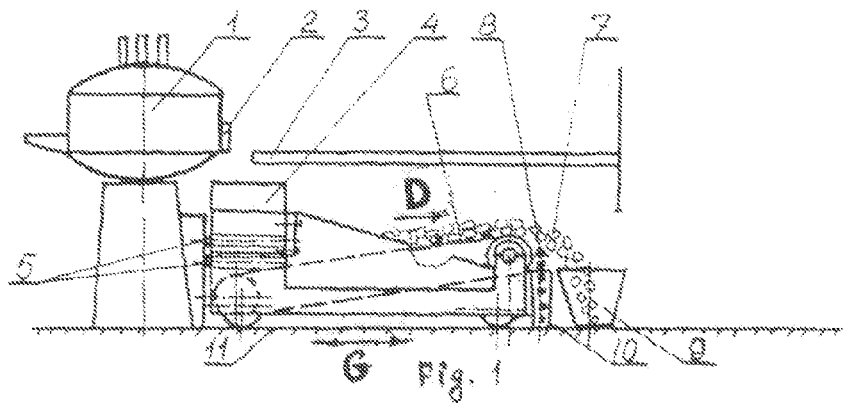
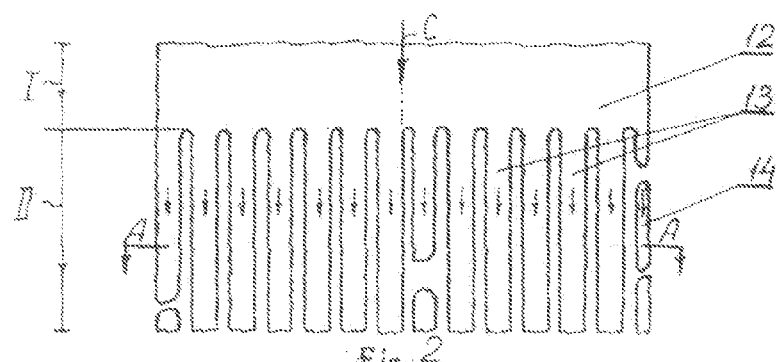
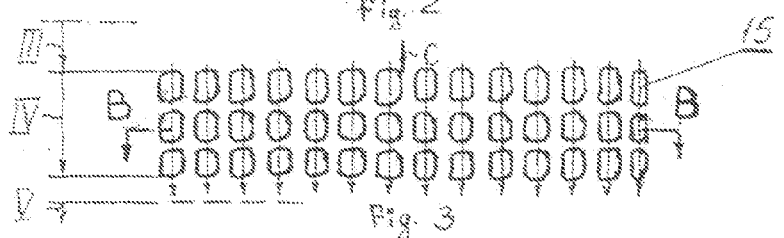
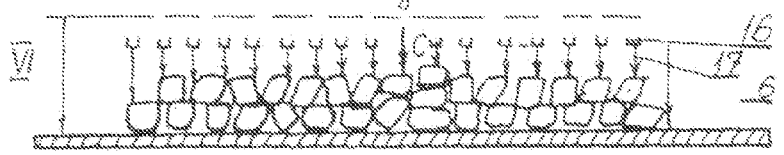
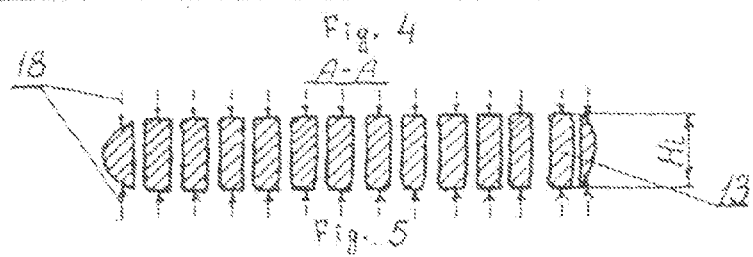
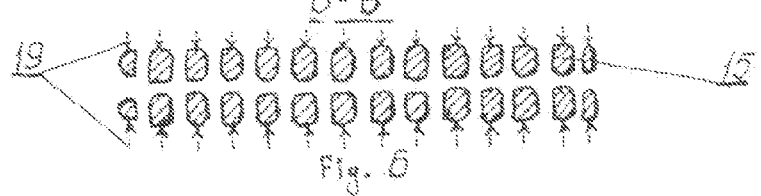

METHOD FOR TREATING SLAG FLOWING FROM A METALLURGICAL VESSEL AND A DEVICE FOR CARRYING OUT SAID METHOD

Applicants claim priority on the Russian Federation Application No. 2007125270 filed Apr. 7, 2007 and this is a Rule 371 application based on PCT Application No. PCT/IB2008/001755 filed on Jul. 3, 2008.

BACKGROUND OF THE INVENTION

The invention relates to metallurgy industry and can be used for processing of metallurgical slags.

Slag is a metallurgical product without which a quality hot metal can not be obtained.

Despite the whole range and purposes of slags formed during metallurgical production the necessity to remove slags separately from metal and their processing are the common thing for all metallurgical processes.

While capacities of metallurgical units increase, an engineering task for arrangement of high-performance removal and processing of slags turned into a serious problem.

A method of slag removal from metallurgical tanks by means of a pot is known [refer to, for example, I. Yu. Zinnurov et al. "Ways of Solving the Problem of Slag Removal Formed during Melting in Arc Furnaces". Magazine "Electrometallurgy", No. 12, 2006, pages 8-13].

The following essential disadvantages are inherent to the known method:

1) There are no technical solutions of slag processing after its leaving a metallurgical unit (tank) in the method;

2) In addition to the essential disadvantage mentioned the method implementation requires expensive stock of equipment, pots and slag cars;

The process of slag removal often restrains the capacity of a metallurgical unit.

A method of slag removal without pots used, the basis of which is slag removal to the shop floor by gravity, its hardening and subsequent slag removal from the metallurgical unit with both wheel-mounted and track-mounted loaders (refer to, for example, the reference document mentioned above) is known.

The following essential disadvantages are inherent to the known method: firstly, arrangement of slag removal with appropriate equipment and its maintenance are required; secondly, slag removal takes a good deal of time as the processes to drain molten slag and to remove hardened slag are separated; thirdly, heavy-load conditions for workers engaged in collection and removal of solid slag.

A method of slag processing including conversion of molten slag into solid state with crushing described in the unit for metallurgical slag processing [refer to, for example, patent RF No. 2099298, C04 B5/02, priority dated Nov. 21, 1995] is known.

The specified method of slag processing combining the processes of slag draining from a metallurgical tank, its hardening and crushing is the most similar to the proposed method by essential features and thus it is taken as a prior art.

An essential disadvantage is inherent to the known method: combining the operations of slag draining, hardening and crushing in the method causes intensive pickup of molten slag on some equipment parts of the unit used to implement the method. The latter requires decreasing the intensity of slag draining from the metallurgical tank what excludes method implementation directly under the metallurgical tank as it restrains unit capacity. The method can be implemented aside from the metallurgical unit what in some degree leads to the specified disadvantages of the method using pots for slag draining.

SUMMARY OF THE INVENTION

The proposed method of slag processing after is leaving the metallurgical tank is free from the specified disadvantages of the known method. The processes of slag cooling down and crushing are also combined in the method; however, a forced cooling down of slag is started at an early stage of molten slag leaving the tank and is finished at the stage of crushed slag removal from under the tank. The mentioned above allows combining the process of slag draining with its cooling and crushing and thereupon obtaining a unit for machine processing and removal of slag directly under (near) the metallurgical tank. Besides, the proposed method of slag processing is based on the provision that final processing of slag with its reprocessing into construction material is performed aside from the metallurgical tank that is the method is purposed to solve the problem of slag receiving, processing and removal directly under the metallurgical tank.

The specified technical solution is provided taking into account the fact that in the method of slag processing after its leaving the metallurgical tank which includes molten slag conversion into solid state with crushing according to the invention a continuous flow of molten slag leaving the tank is firstly divided along the flow direction into separate flows/flow fragments which when moving are forcedly cooled down, then these flows/flow fragments are divided across the flow direction of separate flows/flow fragments into separate parts/pieces which when moving are forcedly cooled down and removed from the tank by means of a conveyor belt. Besides, these parts/pieces are forcedly cooled down on the belt. Moreover the separate flows/flow fragments and divided parts/pieces of slag are forcedly cooled down using a water-air mix and divided parts/pieces of slag on the conveyor belt are forcedly cooled down using water. In addition, the continuous flow of molten slag is divided along its flow direction into separate flows/flow fragments as specified by passing the continuous flow through a top grid. Besides the separate flows/flow fragments are divided into the separate parts/pieces as specified by passing them at least through two top grids, one of which is forced to move back-and-forth. Further the rate of top grid back-and-forth movement is increased as the degree of slag crushing into parts/pieces increases. Again, the parts/pieces of slag are removed from the tank using a profiled conveyor belt on which the parts/pieces of slag are additionally crushed by compression between the profiled belt and a cylindrical roll.

The described method of slag processing after its leaving the metallurgical tank is implemented using the proposed unit.

A unit for processing of metallurgical slags comprising top grids is known (refer to, for example, the specified patent RF JN° 2099298).

The essential disadvantages, analysis of which is given when considering the method of slag processing, are inherent to the known unit.

The proposed unit is free from these disadvantages and allows implementing the proposed method of slag processing directly in the section of its moving from the start of falling of molten slag flow, leaving the metallurgical tank by gravity, up to the end of slag falling already in the form of parts/pieces and removal of these parts/pieces of slag from the metallurgical tank. An additional crushing of parts/pieces of slag during its removing from the metallurgical tank is provided for in the unit if necessary.

BRIEF DESCRIPTION OF THE DRAWINGS

In the drawings:

FIG. 1 is a side elevational of the slag being processed upon exiting the electric furnace;

FIG. 2. is an overhead view of the division of the continuous flow of slag into separate flows/flow fragments, along the direction of its flow;

FIG. 3. is an overhead view of the forced cooling down of the flow fragments during their flow, the crushing of the flow fragments into separate pieces, across the direction of the flow, and the forced cooling down of the separate pieces;

FIG. 4. is an overhead view of the forced cooling down of the separate pieces and their delivery onto the conveyor belt;

FIG. 5. is cross-sectional view along line A-A of FIG. 2;

FIG. 6. is cross-sectional view along line B-B of FIG. 3;

DETAILED DESCRIPTION OF THE PREFERRED EMBODIMENT

The specified technical solution is provided due to the fact that according to the invention the unit comprising the top grids includes at least three top grids installed horizontally and located one above another, one of which can be back-and-forth moved in the horizontal direction. Besides the upper grid is fixed and separated from other grids by space, where a coolant shall be supplied to; the lower grid is also fixed and the grid next to it is provided with back-and-forth moving drive and separated from the conveyor belt by space, where the coolant shall be supplied to, and as a whole all specified grids are installed in a split-type body which can be moved to/from the metallurgical tank. The conveyor belt is made profiled (that is thickened in comparison with the conveyor belt itself and with the tanks inside the belt body) and comes into contact with the cylindrical roll. Moreover the conveyor/profiled belt, its moving drive and the roll are installed on the specified body. In addition the back-and-forth moving drive of the specified top grid is installed on the mentioned body. Besides, water and air shall be supplied to the unit from the fixed plant. Also, top grid fins are made as tight steel ropes. The split-type body of the unit is made of a few supporting frames installed one on another, into which the top grids are inserted. Additionally at least the upper fixed top grid is made with the fins, which are located in the direction of the unit movement to/from the tank, besides the top grid equipped with the back-and-forth moving drive, is made with mutually transverse fins. Also, at least one of the fixed top grids is made with the fins, which are located in the direction of the unit movement to/from the tank, besides the moving top grid is equipped with the drive of back-and-forth moving across the direction of the unit movement to/from the tank. The pitch of the upper fixed top grid fins is made less than the pitch of the lower fixed top grid fins. Moreover the pitch of the movable top grid is equal to/exceeds the pitch of the fixed top grid nearest to it.

The method of slag processing after its leaving the metallurgical tank and the unit of its implementation are illustrated by the drawings in FIGS. 1-10.

Figure 7:
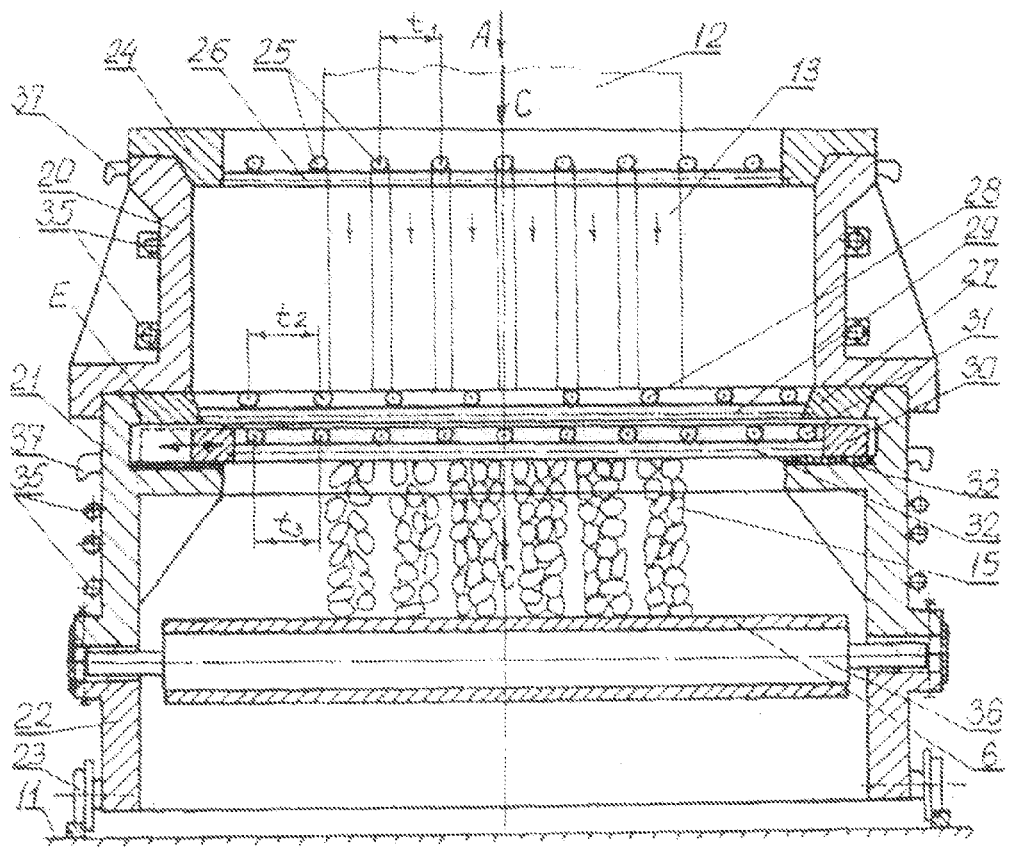
FIG. 7. is an overhead view of the unit for implementation the present method.
Figure 8:
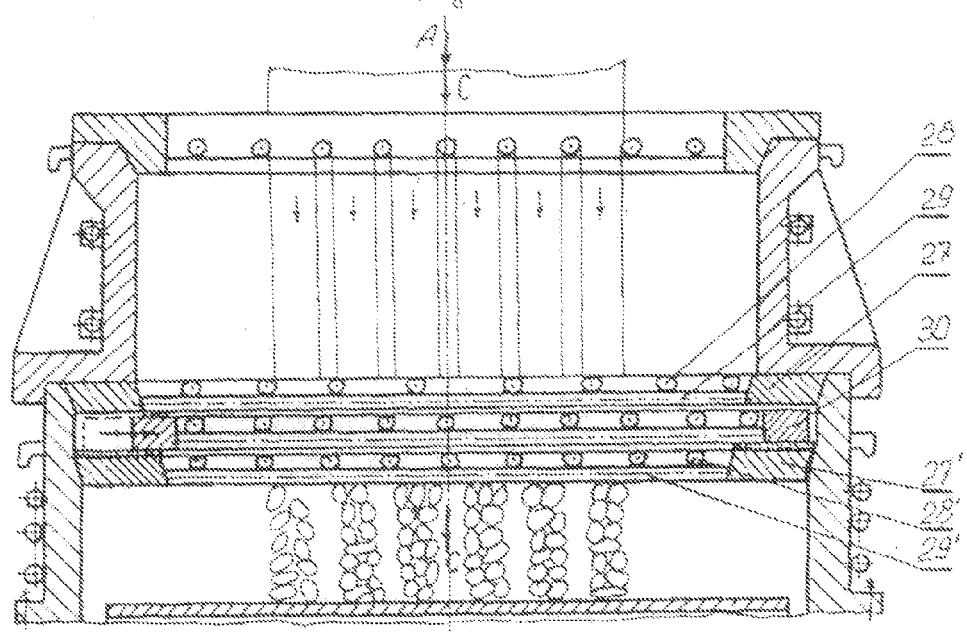
FIG. 8. is an overhead view of the unit depicted in FIG. 7, but with an additional top grid.
Figure 9:
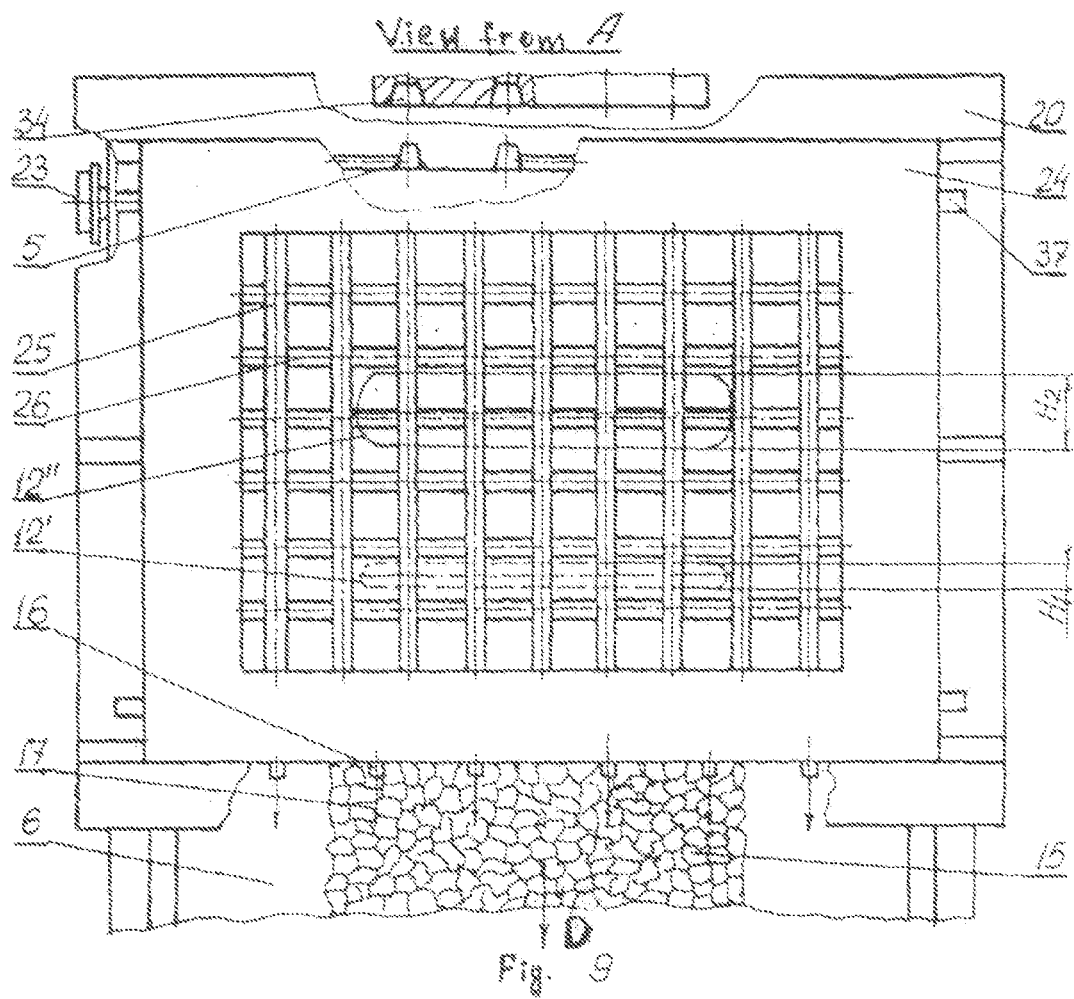
FIG. 9. is a view along line A of FIG. 8.
Figure 10:
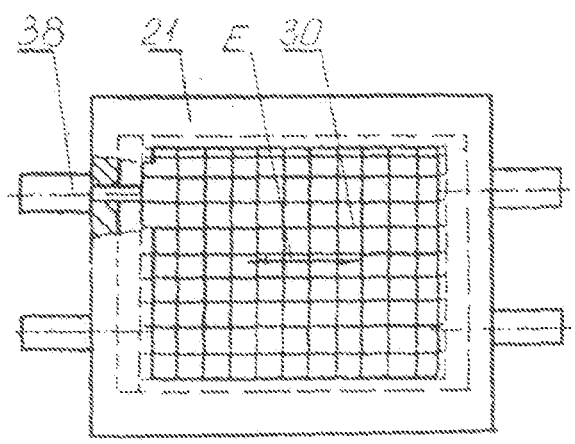
FIG. 10. is an overhead view of a drive of the movable top grid of the unit depicted in FIGS. 7 and 8.

In FIG. 1 an example of metallurgical slag processing after its leaving an electric furnace is shown (a converter, a ladle with slag and others can be used instead of an electric furnace); in FIGS. 2-6 a sequence of the main operations of the proposed method is given: in FIG. 2—dividing of the continuous flow of slag (I) along the direction of its flowing into separate flows/flow fragments (II); in FIG. 3—forced cooling down of the separate flows/flow fragments during their flowing (III), their crushing across the direction of their flowing into separate pieces (IV) and forced cooling down of the separate pieces (V); in FIG. 4—forced cooling down of the separate pieces and their supply onto the conveyor belt; in FIG. 5—section A-A of FIG. 2 and in FIG. 6—section B-B of FIG. 3; in FIG. 7—the unit for implementation the proposed method is shown; in FIG. 8—the unit from FIG. 7, but with an additional top grid; in FIG. 9—a view of the unit from FIGS. 7 and 8 along arrow A; in FIG. 10—possible drives of the movable top grid from FIGS. 7 and 8.

Metallurgical tank 1 (in FIG. 1—an electric furnace) contains hot metal and slag. During metallurgical production slag is separated from metal due to a great difference in their density and, as applied to the electric furnace, is ladled out through window 2 passing operating platform 3. The molten slag leaving the metallurgical tank is passed through unit 4, where it is forcedly cooled down and crushed. The coolant is supplied through unit 5. The pieces of slag are supplied onto conveyor belt 6, which moves them in direction D. Conveyor belt 6 can be made profiled: with the tanks for parts/pieces of slag. In this case cylindrical roll B from FIG. 1 is provided in the unit. Roll B comes into contact with profiled conveyor belt 6. The roll can be driven (the drive is not shown in drawings for clarity) or idle and rotate due to contact with the profiled belt and slag pieces. During transportation of slag pieces 7 and separate metal pieces 8 (partly entering the slag when ladling out) they are supplied into tank 9 (slag) and 10 (metal). A magnetic separator (it is not shown in FIG. 1 for clarity) is used to separate metal pieces from slag. Unit 4 together with conveyor belt 6 is wheeled and driven along the floor of shop 11 to/from the metallurgical tank (arrows G in FIG. 1). During slag processing (falling in direction C) it passes stage I (FIG. 2) as continuous flow 12, stage II as separate longitudinal flows 13 and flow fragments 14, stage III (FIG. 3) of forced cooling down of separate flows 13 and flow fragments 14, which starts immediately after dividing continuous flow 12 into separate flows 13, stage IV of dividing separate flows 13 and flow fragments 14 into parts/pieces 15, which at stage V, starting immediately after dividing separate flows 13 into separate parts/pieces 15, are forcedly cooled down and supplied onto conveyor belt 6 (FIG. 4), on which slag pieces (and separate metal pieces) are forcedly cooled down (stage VI in FIG. 4) by jets 17 flowing out of the pipes. The slag, divided into separate flows 13, is forcedly cooled down by jets 18 at least from both sides of flows 13 (FIG. 5); slag parts/pieces 15 are forcedly cooled down by jets 19 at least from both sides of pieces 15 (FIG. 6).

Unit 4 (FIG. 1) for implementation of the method comprises the split-type body, consisting of supporting frames 20, 21 and 22 installed one on another (FIG. 7) and on wheels 23, and equipped with the drive of unit 4 moving along the floor 11. Top frame 24 with fins 25 and 26 is installed in the upper part of supporting frame 20. Top frame 24 is fixed replaceably by lifting, besides the first (upper) are fins 25, the direction of which coincides with direction G of unit 4 moving to/from metallurgical tank 1 (FIG. 1). Top frame 27 with fins 28 and 29 is fixed in the upper part of supporting frame 21. Preferably fins 29 and 28 are installed in top frame 27 similarly to fins 25 and 26 in top frame 24. As a result of moving, top frame 27 is squeezed up with supporting frame 20, on removing of which upwards top frame 27 can be taken (for replacement) out of body 21 by lifting. Top frame 30, the lower one relatively to top frame 27, is equipped with fins 31 and 32, the closest (with clearance of 3 . . . 5 mm) to top frame 27 and made movable back-and-forth (arrow E) relatively to upper top frame 27. Top frame 24 is equipped with fins 25 and 26 with pitch t1, top frame 27—fins 28 and 29 with pitch t2 and top frame 31—fins 31 and 32 with pitch t3. Preferably t2>t1 and t2>t3, besides the length of top frame 30 back-and-forth moving exceeds pitch t2. When top frame 27 is removed as described, top frame 30 can also be removed upwards (for replacement). Top frame 30 moves being supported by copper (bronze) pads 33. In order to provide unit 4 with the coolant for slag cooling at the specified stages of its processing, unit 4 (FIG. 1) receives the coolants from unit 34, which is fixed relatively to floor 11, through unit 5 after setting unit 4 to operating position. Then the coolants are supplied to the places of supply to the slag through pipes 35. Conveyor belt 6 (FIG. 1) is supported on roller 36 and a roller at the side where slag handling is finished (FIG. 1). Preferably the latter is provided with the drive of belt 6 moving in direction D and the tension system of this belt (they are not shown in the drawings for clarity as it is known from the technical references). In order to replace roller 36, supporting frame 22 is disconnected from supporting frame 21. Thus, the body of unit 4 is split-type, and bosses 37 are used for its disassembling. The third fixed top grid 27' with fins 28' and 29' is added to unit 4 for finer crushing of slag and in this case movable top grid 30 is located between top grids 27 and 27' (FIG. 8). A possibility of simplified design of the top grids is also provided in unit 4: the upper top grid 24 is only with fins 25, located in direction G of units 4 moving to/from metallurgical tank 1; in this case the movable top grid 30 is made with mutually transverse fins 31 and 32; moreover back-and-forth moving of this grid across direction G of unit 4 moving to/from metallurgical tank 1 is provided for. At all the designs of top grids 24, 27 and 30 the pitch of fins t1, t2 and t3 depends (mainly) on the slag ladled out of the metallurgical tank (sticky, foamed), on the intensity of slag flow (flow thicknesses H1 and H2 in FIG. 9). For increased intensity of slag flow in the top grids the pitch is increased, for decreased intensity ti is decreased. As when slag is removed from the metallurgical tank, thickness H1 of slag flow is changed and it is displaced in the horizontal plane relatively to the top grids (for example, on removing slag from the electric furnace when rotating its body 1 the slag flow 12, firstly, is moved from position H1 into position H2 in FIG. 9, secondly, it is mainly H2>H1), the design of top grids 24, 27 and 30 with a variable pitch of fins t1 that is less for low intensity of slag flow (for example, H1 in FIG. 9) and more for high intensity of slag flow (for example, H2 in FIG. 9), is possible.

The design of fins 26 and 25, 28 and 29, 31 and 32 of top grids 24, 27 и 30 accordingly is of great importance for operation of unit 4. The specified fins can be cast, integral with frames 24, 27 and 30. However, it is preferable that the specified fins are made as tight ropes. The preferable design of the top grid fins as tight ropes is conditioned by two main reasons: firstly, the ropes spring at slag flow impact what decreases slag pickup on the fins, secondly, the ropes for slag (taking into account its increased viscosity) have a low thermal conductivity inside the rope and thus during slag removal from the metallurgical tank they do not lose the degree of tension essentially.

Conveyor belt 6 used for slag pieces 15 removal in direction D can be installed on its body with the drive of belt moving in direction D and the drive of its body moving to/from metallurgical tank 1. However, it is preferable that conveyor belt 6 and the drive of its moving in direction D are installed on the body integral with supporting frame 22 and connected (disconnectably) with supporting frame 21. Such a design allows having a single unit 4 of processing and removing the slag leaving metallurgical tank 1. However, in particular, a rope drive (analogue of ingot carrier drive) can be used for unit 4 moving to/from the tank.

The necessary motion of top grid 30 can be performed by means of the drive installed outside the unit 4, but preferably this drive is installed on the body of unit 4. This drive can be electromechanical or use hydraulic and pneumatic cylinders. The use of the pneumatic cylinders is preferable. An example of the top grid drive from cylinders 38 installed on supporting frame 21 of unit 4 is shown in FIG. 10.

The forced cooling down of slag used during its processing is divided into water-air cooling at stages III and V (FIG. 3, FIGS. 5 and 6, jets 18 and 19) and cooling by water jets 17. Such a performance of the forced cooling down of slag excludes the possibility of water vapour explosion. At the same time when slag flow 12 is fine divided into separate flows 13/flow fragments 14, water-air jets 18 and 19 at stages III and V are replaced by water ones as in this case the possibility of water vapour explosion is almost eliminated.

The method of the metallurgical slag processing after its leaving the metallurgical tank is implemented as follows (it is considered by the example of slag draining from the electric furnace).

Before slag removal from electric furnace 1 (FIG. 1), unit 4 for slag processing is moved to the furnace (arrow G). The coolant (water, air) is supplied from unit 34, fixed relatively to floor 11, to pipelines 35 by means of units 5 (FIG. 1, 7-9). Unit 4 is locked and tank 9 for slag pieces receipt and tank 10 for metal pieces receipt are installed to it (FIG. 1).

Electric furnace 1 is rotated clockwise (in FIG. 1) and slag is ladled out through window 2. The process of slag removal is controlled from operating platform 3.

The continuous flow of slag 12 flows down in direction C (in FIGS. 1-4, 7 and 8) and comes in contact with fins 25 and 26 of top frame 24 (FIGS. 7 and 8). According to the proposed method this is stage I of slag processing (FIG. 2).

As a result of contact with fins 25 and 26 the continuous flow of slag 12 is divided into separate flows 13 (and flow fragments 14), thus creating the conditions for rapid cooling down of slag. According to the proposed method this is stage II of slag processing (FIG. 2).

Separate flows 13/flow fragments 14 are forcedly cooled down by water-air jets 18 (FIG. 5) first of all from both surfaces of thickness Hi, besides jets 18 penetrate into the sections of the continuous flow dividing into the separate flows and cools them down from these surfaces. Thus, each separate flow 13/flow fragment 14 is cooled down from four sides. In case of relatively fine dividing of the continuous flow into the separate flows (for example, by section of 25 . . . 80 $mm^2$) jets 18 are formed of water. According to the proposed method this is stage III of slag processing (FIGS. 3 and 5).

The cooled down separate flows of slag falling in direction C come into contact with top frame 27 (FIG. 7). Due to the fact that pitch t2 of this grid exceeds pitch t1 of top grid 24 the separate flows of slag 13/flow fragments 14 pass (mainly) through the windows of grid 27 freely and come into contact with fins 31 and 32 of top grid 30 moving back-and-forth relatively to top grid 27 from drive 38. The stroke of grid 30 exceeds pitch t2 of grid 27, thus separate flows 13/flow fragments 14 are divided (by displacement) into separate pieces 15 (FIG. 3). Thus, separate flows 13/flow fragments 14 are divided into separate pieces 15, besides the rate of top grid 30 back-and-forth moving relatively to grid 27 is increased to increase the dividing ratio (reduce the sizes of pieces 15). Moreover the movement of top grid 30 in the direction of flow thickness H1 (FIG. 5), that is in the direction coinciding with the direction of unit 4 motion to/from the metallurgical tank, is taken as the basis. However, in unit 4 with the reduced pitch t1 of top grid 24 the top grid 30 is moved in the direction transverse to the specified one. In the latter case the location of drive 38 of top grid 30 on the body of supporting frame 21 is simplified. According to the proposed method this is stage IV of slag processing (FIG. 3).

Slag pieces 15, obtained at stage IV, continue falling (ref. arrow C in FIG. 3) in the direction of conveyor belt 16 and at stage V (FIG. 3) they are forcedly cooled down by water-air jets 19 (FIG. 6). If more rapid cooling down is required, water-air cooling down is replaced by water cooling.

At the last stage of processing, VI in FIG. 6, the slag pieces fall onto conveyor belt 6 (FIGS. 1, 4, 7 and 9), at which they are forcedly cooled down by water jets flowing out of pipes 16 and carried in direction D (FIG. 1, 9) to slag tank 9, besides the separate metal pieces are detached by means of the magnetic separator and supplied to tank 10.

The ratio of slag parts/pieces 15 crushing is increased by using the profiled belt (thickened belt including a split-type one, with the tanks for slag pieces on the surface) for their removal, on which slag parts/pieces 15 are additionally crushed by compression between profiled belt 6 and cylindrical roll B (FIG. 1).

During slag removal from a series of the metallurgical tanks (for example, from the electric furnace) continuous flow of slag 12, firstly, has a variable thickness (H1 and H2 in FIG. 9 and Hi in FIG. 5), secondly, moves from position 12', remote from the metallurgical tank, into position 12" (FIG. 9), near to the metallurgical tank. It is taken into account and the rate of top grid 30 back-and-forth moving is increased what eliminates a noticeable influence of thickness H1 of continuous flow of slag 12 on the sizes of parts/pieces 15. Moreover at stability of the mentioned positions the pitch of the top grid fins is changed from larger in the region of falling relatively to a thin continuous flow of slag 12' (H1 in FIG. 9) to smaller in the region of falling relatively to a thick continuous flow of slag 12" (H2 in FIG. 9). However, this technical solution is rarely used to because there is no strict regularity in formation of thickness D of continuous flow of slag 12.'

Besides in cases of slag removal with the possibility of predictable influence on thickness H1 of continuous flow of slag 12 (for example, slag pouring from the slag pot, from the ladle with slag that is aside from the smelting unit) the top grids only with the fins located in the direction of unit 4 moving to/from the tank are used in unit 4 (that is only fins 25 in grid 24 and only fins 28 in grid 27 in FIGS. 7 and 8). Moreover, movable top grid 30 is made with mutually transverse fins 31 and 32.

In addition movable top grid 30 is preferably equipped with drive 38 of back-and-forth moving across the direction of unit 4 moving to/from the tank. However the mentioned solution of the task of top grid 30 movement is implemented if there is an operating place near the metallurgical tank which is sufficient to locate mechanisms 38 of the grid drive on body 4.

Thus, the relevant technical task of the metallurgical tank operation and the necessity for removal of a good deal of molten slag conditioned by this operation are compactly solved in the developed method of processing the slag leaving the metallurgical tank as well as in the unit of its implementation. This task is solved at the section of slag falling after its leaving the tank in molten state by gravity. Task solving is finished by removal of the cooled down crushed slag using the carrier. Besides the required degree of the forced cooling down of molten slag is provided for by dividing the continuous molten flow into the separate flows, accelerated forced cooling of which is significantly simplified. Moreover there is no risk of slag explosion resulting from water evaporation. Compressibility of technical implementation of the solution is provided due to applying a set of the top grids, taking a minor part of the distance on the way of slag moving at its falling down, in it. So, the technical task of conversion of molten slag leaving the tank into solid pieces and their removal from the metallurgical tank is solved by means of this proposal. The slag pieces are processed with conversion into construction material aside from the metallurgical tank, i.e. this proposal does not cover the specified slag processing.

Example. An electric furnace (electric arc steelmaking furnace) provides releasing 100 t of melted steel. During melting about 100 kg/t of slag, i.e. 10000 kg, is formed. When removing molten slag from the electric arc steelmaking furnace (1 in FIG. 1) it is rotated to the side of window 2 and the slag leaves the effective volume of the electric arc steelmaking furnace, at first with thickness H1 and then, as the electric arc steelmaking furnace is rotated, with thickness H2 (FIG. 9). Besides (ref. FIG. 9) the trace of slag falling is shifted. On the way of molten slag moving (as close to the body of the electric arc steelmaking furnace as possible, but not preventing it from rotating) continuous flow 12 meets top grid 24 of unit 4, provided with fins 25 and 26 with pitch t1=100 mm. Continuous flows of molten slag 12 is divided into separate flows 13 with width≈100 mm and thickness Hi≈100 mm. Separate flows 13 are intensively cooled down by means of a water-air tank (water cooling is possible) at the outlet from top grid 24 and up to inlet into top grid 27. Actually each separate flow 13 is cooled down from four surfaces thanks to what each flow 13 is cooled down to plastic state by the time of its coming into top grid 27. Pitch t2 of the grid, equal to 170 mm, allows separate flows of slag 13 to pass through it freely and come into top grid 30 having pitch t3≈t1. Top grid 30 back-and-forth moves relatively to top grid 27 (arrow E in FIG. 7) from drive 38 with travel of 220 mm, thus separate flows 13 are divided into parts/pieces 15, which are cooled down by water-air mix or water at the outlet from top grid 30. Pieces 15 (FIGS. 7 and 9) fall onto conveyor belt 6 and are cooled down by water jets 17 flowing out of pipe branches 16 immediately. The cooled slag pieces (with possible separate pieces of steel) are carried into tank 9, besides the possible separate pieces of steel, which come into the tank (10), are detached by means of the magnetic separator. Tanks 9 and 10 are removed. Unit 4 is taken away from the metallurgical tank along floor 11 for the time, free from slag receipt, and if necessary the blocked top grids are promptly replaced (or cleaned) and unit 4 is taken to the tank again.

The invention claimed is:

1. A method of slag processing after its exit from a steelmaking unit which includes conversion of molten slag into solid state with crushing into pieces, is characterized in that a continuous flow of molten slag which exits the steelmaking units is first divided along the flow into separate flows/flow fragments, which are forcedly cooled down during their flowing, and then these flows/flow fragments are divided across the direction of the separate flows/flow fragments into separate parts/pieces, which are forcedly cooled down during their flowing and moved from a tank by means of a profiled conveyor belt, and these parts/pieces of slag are forcedly cooled down on the profiled belt; and wherein the parts/pieces of slag are additionally crushed by compression between the profiled conveyor belt and a cylindrical roll.

2. The method according to claim 1, characterized in that the separate flows/flow fragments and divided parts/pieces of slag are forcedly cooled down using water-air mix, and the divided parts/pieces of slag are forcedly cooled down on the conveyor belt by means of water.

3. The method according to claim 1, characterized in that the continuous flow of molten slag is divided along the direction of flow into the separate flows/flow fragments by passing the continuous flow through a top grid.

4. The method according to claim 1, characterized in that the separate flows/flow fragments are divided into the separate parts/pieces by passing them at least through two top grids, one of which moves back-and-forth.

5. The method according to claim 4, characterized in that a top grid moves back-and-forth to thereby crush the slag into parts/pieces.

6. The method according to claim 1, characterized in that a top grid moves back-and-forth to thereby crush the slag into parts/pieces.

7. A method of slag processing after its exit from a steelmaking unit which includes conversion of molten slag into solid state with crushing into pieces, is characterized in that a continuous flow of molten slag which exits the steelmaking units is first divided along the flow, by passing the continuous flow through a top grid, into separate flows/flow fragments which are forcedly cooled down during their flowing, and then these flows/flow fragments are divided across the direction of the separate flows/flow fragments into separate parts/pieces, which are forcedly cooled down during their flowing and moved from a tank by means of a conveyor belt, and these parts/pieces of slag are forcedly cooled down on the belt.

8. A method of slag processing after its exit from a steelmaking unit which includes conversion of molten slag into solid state with crushing into pieces, is characterized in that a continuous flow of molten slag which exits the steelmaking units is first divided along the flow into separate flows/flow fragments, which are forcedly cooled down during their flowing, and then these flows/flow fragments are divided across the direction of the separate flows/flow fragments into separate parts/pieces, which are forcedly cooled down during their flowing and moved from a tank by means of a conveyor belt, and these parts/pieces of slag are forcedly cooled down on the belt, wherein the separate flows/flow fragments are divided into the separate parts/pieces by passing them through at least two top grids, at least one of which moves back-and-forth.

9. The method according to claim 8, wherein the back-and-forth movement of the top grid crushes the slag into parts/pieces.

* * * * *